Patented Aug. 7, 1945

2,381,247

UNITED STATES PATENT OFFICE 2,381,247

PLASTICIZED COMPOSITIONS

Robert H. Barth, Ridgewood, and Harry Burrell, Paramus, N. J., assignors, by mesne assignments, to Heyden Chemical Corporation, New York, N. Y., a corporation of Delaware No Drawing. Application July 22, 1942, Serial No. 451,946

1 Claim. (Cl. 106—180)

This application is a continuation-in-part of our prior and copending application Serial No. 378,052, filed February 8, 1941, which has issued as Patent No. 2,356,745.

This invention relates to the use of esters of more than one acid radical of pentaerythritol and related compounds as plasticizers for a wide variety of resins and cellulose derivatives with which they are compatible, and in which they serve to plasticize, soften, elasticize, lubricate, and otherwise modify these compounds. The resulting compositions may be molded under pressure, dissolved in solvents to form coating compositions, extruded to form ribbons, fibers, or structural shapes, emulsified, or otherwise prepared to be used as textile assistants, and so forth.

The esters employed in carrying out this invention may be used with cellulose nitrate, cellulose acetate, cellulose acetobutyrate and other cellulose esters, ethyl cellulose, methyl cellulose, benzyl cellulose and other cellulose ethers, damar, manila, rosin, ester gum, and other natural resins, polystyrene, polyvinyl esters and acetals, chlorinated rubber, phenol-formaldehyde, urea-formaldehyde, melamine-formaldehyde and other synthetic resins, castor oil, triacetin, tricresyl phosphate, dibutyl phthalate and other plasticizers if necessary, and with or without such solvents, pigments or fillers as may be desirable.

The plasticizers may be incorporated with these ingredients according to methods well known in the art, as for example by dissolving in a mutual solvent and subsequently evaporating the solvent, by kneading at an elevated temperature, if desired, and conveniently in a machine of the Banbury mixer type, by milling on differential rolls, and so forth.

The acetate and the propionate of pentaerythritol have been described in the literature and are not claimed as coming within the scope of this invention. Because these materials are solids, because they are water sensitive, and for other reasons, their use has been limited. We have found, however, that certain other esters and classes of esters are highly desirable as modifying agents, and these will be pointed out, and other objects of the invention will be indicated.

In the manufacture of pentaerythritol by the condensation of acetaldehyde and formaldehyde, in addition to the pentaerythritol itself, smaller amounts of related hydroxylated substances are also obtained. One of these, which is obtained in a considerable amount, is dipentaerythritol, which is an ether having the following structure:

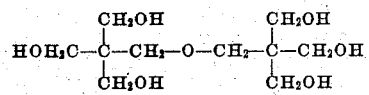

(See Brün, "Ueber den Dipentaerythrit," Wilhelm Greven, Krefeld, 1930). Another related hydroxylated substance, obtained in somewhat smaller amounts, is white and crystalline, melts at 230–240° C., and has a hydroxyl content of 33%. It is related to dipentaerythritol in that it contains pentaerythritol residues bound by ether linkages. Regardless of chemical structure, for purposes of definition in this specification and in the claims, this substance will be termed "pleopentaerythritol."

According to the best evidence available, pleopentaerythritol is probably a mixture of dipentaerythritol, tripentaerythritol, and possibly additional related alcohols.

Dipentaerythritol, tripentaerythritol, and pleopentaerythritol may be grouped together under the generic term "polypentaerythritols," by which term is meant those compounds of higher molecular weight than pentaerythritol which are formed either actually or theoretically by etherifying one or more of the hydroxyl groups of pentaerythritol with other pentaerythritol residues.

The normal esters of pentaerythritol and the polypentaerythritols may be formed by using methods long known in the art, such as heating the polyhydric alcohols with acids or anhydrides, with or without a catalyst, under conditions favorable to the removal of water. Mixed esters may be conveniently prepared according to the methods illustrated in the examples.

Among the acids suitable for esterifying pentaerythritol and polypentaerythritols may be mentioned acetic, propionic, butyric, lauric and other straight or branched-chain fatty acids, isobutyric, valeric, phenylacetic, 2-ethylhexoic, levulinic, and other carboxylic acids, including abietic.

Mixed esters such as pentaerythritol diacetate dipropionate, pentaerythritol diacetate dibutyrate, dipentaerythritol diacetate dipropionate dibutyrate, dipentaerythritol triacetate tripropionate, etc., are excellent plasticizers. They are compatible with a wide variety of plastic and film-forming materials, are liquids with low solidification points, are substantially colorless and odorless, and are very stable. Mixed esters containing at least one long carbon chain acid radical and one or more short chain acid radicals, such as for instance pentaerythritol monostearate triacetate, may well serve as both a lubricant and a plasticizer, a substance much to be desired in the molding art, and especially in injection molding.

Normal esters (that is, pentaerythritol-type esters in which substantially all of the acid radicals are identical) are also good plasticizers. Pentaerythritol butyrate, for instance, combines several excellent properties of a liquid plasticizer. In general, however, the normal esters of the polypentaerythritols are more adapted to plasticizer usage than the corresponding pentaerythritol esters, since they are usually lower melting. The acetate of pleopentaerythritol is especially indicated, since the hardness of compositions plasticized with this compound does not materially decrease with increasing proportions of the plasticizer.

The following examples are intended as illustrative only, and should not be so construed as to limit the invention as to scope or proportions. Parts are by weight.

*Example 1.*—A charge of pentaerythritol or its equivalent of a polypentaerythritol was refluxed with a mixture consisting of a suitable carboxylic acid in an amount equal to 110 mol per cent of that required for complete esterification, toluene in an amount equivalent to one-half to one-third the pentaerythritol or polypentaerythritol weight and concentrated sulfuric acid in an amount equivalent to one-quarter to one-half per cent of the total weight of reactants, until the theoretical amount of water was removed and collected in a trap designed for that purpose. The reaction mass was dissolved in 4 to 5 times its volume of isopropyl ether and extracted successively with water, with aqueous sodium bicarbonate and finally with water. The solvents were removed and the residue either distilled under vacuum or treated with decolorizing charcoal and filtered. Specific compounds made by this process are tabulated below.

Table I

| Compound | Calculated mol. weight | Boiling point, °C. | Parts by weight of acid used | Parts by weight of hydroxy compound used |
| --- | --- | --- | --- | --- |
| Pentaerythritol tetrabutyrate. | 416.3 | 180–190 at 2 mm. | 1,940 | 680 |
| Dipentaerythritol hexabutyrate. | 674.3 | | 1,440 | 635 |
| Dipentaerythritol hexapropionate. | 590.2 | | 1,210 | 635 |
| Pleopentaerythritol propionated. | (¹) | | 980 | 600 |
| Pleopentaerythritol butyrated. | (¹) | | 1,166 | 600 |
| Pentaerythritol tetrachloroacetate. | 402 | 70 (m.p.) | 2,079 | 680 |

¹ Not known.

*Example 2.*—A charge of pentaerythritol or a polypentaerythritol was refluxed with 5 mol per cent more acid anhydride (or acid chloride) than that required to completely esterify the hydroxy compound. The time of heating depended upon the hydroxy compound and the acid anhydride (or chloride). The liberated acids were removed by distillation and the products either distilled under vacuum, or treated with decolorizing charcoal or subjected to suitable recrystallization procedures. The following table lists the particular compounds made by this general method.

Table II

| Compound | Calculated mol. weight | Melting point, °C. | Parts by weight of acetic anhydride | Parts by weight of hydroxy compound |
| --- | --- | --- | --- | --- |
| Dipentaerythritol hexaacetate. | 506.1 | 70–75 | 672 | 254 |
| Pleopentaerythritol, acetylated. | | 54–55 | 462 | 200 |
| Pentaerythritol tetrabenzoate ¹. | 552 | 74–76 | ¹ 343 | 68 |

¹ Benzoyl chloride used.

*Example 3.*—When a mixture of pentaerythritol and a pentaerythritol tetraester is heated in the presence of an alkaline catalyst, such as anhydrous potassium carbonate, an alcoholysis of the ester occurs. Thus when one molecular equivalent of pentaerythritol and one molecular equivalent of pentaerythritol tetraacetate, m. p. 82°, were heated with a small amount (e. g. 0.1%) of potassium carbonate at 150° C. for two to four hours, new products were formed which contained both hydroxyl and acetate groups. When this material was vacuum distilled at 2 mm. pentaerythritol diacetate, b. p. 207–215, was obtained as the major product. Similarly, if one mol of pentaerythritol and three mols of the tetraacetate are heated with the catalyst and distilled at a pressure of 2 mm. a new monohydroxy triacetate compound of pentaerythritol is formed, b. p. 176–182° C. Similarly, there have been made hydroxy acetates of dipentaerythritol and hydroxy propionates of pentaerythritol. Some of these can be distilled while others are too high boiling. The monoacetate of pentaerythritol has not been distilled, although it has been made by this process.

*Example 4.*—Mixed esters may be formed from the products of Example 3 by heating the hydroxy ester under reflux with an acid chloride or anhydride of an acid different from that used to provide the ester groups in the hydroxy ester. Typical mixed esters prepared in this fashion are listed in the following table.

Table III

| Compound | Calculated mol. weight | Starting hydroxy ester | Physical properties |
| --- | --- | --- | --- |
| Pentaerythritol triacetate monostearate. | 528 | Pentaerythritol monostearate. | M. p. 36–38° C. |
| Pentaerythritol tripropionate monomyristate. | 514 | Pentaerythritol monomyristate. | Soft wax. |
| Pentaerythritol triacetate monopropionate. | 318 | Pentaerythritol triacetate. | B. p. 162–164° at 2 mm. |
| Pentaerythritol diacetate dipropionate. | 332 | Pentaerythritol diacetate. | B. p. 173–180° at 2 mm. |
| Dipentaerythritol triacetate tripropionate. | 548 | Dipentaerythritol triacetate. | Viscous liquid. |
| Pentaerythritol diacetate dibutyrate. | 360 | Dipentaerythritol diacetate. | B. p. 160–165° at 2 mm. |

*Example 5.*—When one molecular equivalent of pentaerythritol and 2 or more molecular equivalents each of the anhydrides of acetic and propionic acid were refluxed together, both acid groups entered the molecule in such a way that 90% of the product was pentaerythritol diacetate dipropionate, b. p. 173–180° at 2–3 mm.

*Example 6.*—Molding compositions were prepared by mixing 150 parts of a 33.3% solution of cellulose acetate (equivalent to 50 parts on a dry basis) with 5.5 parts of the pentaerythritol derivatives listed below as plasticizers. The volatile solvent was allowed to evaporate and the hard, horny residue was comminuted. The resulting molding compositions were hot pressed at 175° C. at 2000 lbs. per sq. in. pressure. The die was chilled before ejecting the piece. The molding properties are shown in the following table.

*Table IV*

| | Plasticizer | Molding properties | Molded piece |
|---|---|---|---|
| 1 | Pentaerythritol diacetate dipropionate. | Softened quickly and flowed easily and well. | Glass clear, well formed, glossy; an excellent molding. |
| 2 | Dipentaerythritol hexapropionate. | Softened slightly slower than above but flow was very satisfactory. | Molding of identical appearance with above. |
| 3 | Pleopentaerythritol propionate. | Softened quickly and flowed well. | Molding of identical appearance with above. |

*Example 7.*—The following table records the compatibility of the listed plasticizers with a variety of film forming materials. The symbols used have the following meanings:

C = compatible.
10, 25, or 67 = approximate maximum per cent of plasticizer which can be used to provide a satisfactory film.
I = incompatible.
T = compatible, but film was tacky.

the compositions of lacquers which may be made up using the plasticizers of this invention.

*Formula 1*

| | Parts |
|---|---|
| Chlorinated rubber | 2 |
| Dipentaerythritol hexapropionate | 0.9 |
| Cumaron resin | 1 |
| Xylene | 5 |

*Formula 2*

| | Parts |
|---|---|
| Cellulose acetobutyrate, low viscosity | 12 |
| Dewaxed dammar | 0.5 |
| Pleopentaerythritol propionate | 3 |
| Acetone | 48 |
| Methyl Cellosolve acetate | 13 |
| Ethyl lactate | 3 |
| Butanol | 4 |
| Ethylene dichloride | 61 |
| Toluol | 54 |

*Formula 3*

| | Parts |
|---|---|
| Cellulose acetate (low viscosity lacquer type) | 20 |
| Pentaerythritol diacetate dipropionate | 10 |
| Methyl ethyl ketone | 37 |
| Acetone | 15 |
| Diacetone alcohol | 15 |

The versatility and wide applicability of the mixed esters of pentaerythitol and of polypentaerythritols is evidenced in the foregoing examples. Many modifications of these esters are possible, and the various permutations and combinations of mixed esters may easily be arranged to fill a specific need by one skilled in the art, by following the general and specific methods given.

Having thus described our invention, what we

| Film former | Pentaerythritol diacetate dipropionate | Pleopentaerythritol acetate | Pentaerythritol monostearate triacetate | Dipentaerythritol hexa propionate | Pleopentaerythritol propionate | Pentaerythritol tetrabutyrate | Dipentaerythritol hexabutyrate | Pleopentaerythritol butyrate | Pentaerythritol diacetate dibutyrate | Dipentaerythritol triacetate tripropionate | Pentaerythritol tripropionate monomyristate |
|---|---|---|---|---|---|---|---|---|---|---|---|
| Cellulose nitrate | C.67 | C.67 | C.25 | C.67 | C.67 | C.67 | C.67 | C.67 | C.67 | C.67 | C.67 |
| Cellulose acetate | C.67 | C.67 | I | C.25 | C.25 | C.25 | C.10 | I | C.67 | C.67 | I |
| Cellulose acetobutyrate | C.67 | C.67 | C.10 | C.67 | C.67 | C.67 | C.67 | C.67 | C.67 | C.67 | C.67 |
| Ethyl cellulose | C.67 | C.25 | I | C.67 | C.67 | C.67 | C.67 | C.67 | C.67 | C.67 | C.67 |
| Chlorinated rubber | C.67 | C.67 | C.25 | C.67 | C.67 | C.67 | C.67 | C.67 | C.67 | C.67 | C.67 |
| Polyvinyl acetate | C.10 / T.67 | C.25 / T.67 | I | C.10 / T.67 | C.25 / T.67 | C.25 | C.10 | C.25 | C.10 | C.10 | I |
| Polyvinyl acetal | C.25 | C.67 | I | C.25 | C.67 | C.10 | I | I | C.25 | C.67 | I |
| Polystyrene | C.67 | I | I | C.25 | C.25 | C.25 | C.25 | C.10 | C.10 | I | C.25 |
| Batavia dammar | T.25 | | | C.25 | C.25 | | | | | | |
| "Bakelite XR 3180" | T.25 | | | T.25 | I | | | | | | |
| Ester gum | C.10 | | | T.25 | C.10 | | | | | | |
| Cumaron resin | C.25 | | | C.25 | C.25 | | | | | | |
| Rosin | C.10 / T.25 | | | T.25 | T.25 | | | | | | |
| Shellac | C.25 | | | C.25 | C.25 | | | | | | |
| Urea-butanol-formaldehyde resin | C.67 | I | I | C.67 | C.25 | C.25 | C.25 | C.67 | C.67 | | |

The film prepared from polystyrene plasticized with 67% pentaerythritol diacetate dipropionate was non-tacky but was very rubber-like in character, having a great "nerve" or elasticity.

It may be seen from these examples that the pentaerythritol plasticizers have a widespread compatibility and may be used in considerable amounts in lacquers.

*Example 8*—The following formulas illustrate claim as new and desire to secure by Letters Patent is:

A composition comprising a material selected from the group consisting of film-forming resins and cellulose esters and ethers and as a plasticizer for said material and incorporated therewith a mixture of pentaerythritol diacetate dipropionate and dipentaerythritol triacetate tripropionate.

ROBERT H. BARTH.
HARRY BURRELL.